SUM-DIFFERENCE FEED NETWORK

Filed July 12, 1966 4 Sheets-Sheet 1

INVENTORS
JOHN PAUL SHELTON
& GEORGE G. CHADWICK

BY Hurvitz & Rose

ATTORNEYS

INVENTORS
JOHN PAUL SHELTON
& GEORGE G. CHADWICK

BY Hurvitz & Rose

ATTORNEYS

SUM-DIFFERENCE FEED NETWORK

Filed July 12, 1966

4 Sheets-Sheet 3

INVENTORS
JOHN PAUL SHELTON
& GEORGE G. CHADWICK

BY Hurvitz & Rose

ATTORNEYS

INVENTORS
JOHN PAUL SHELTON
& GEORGE G. CHADWICK
BY Huntz & Rose
ATTORNEYS

United States Patent Office 3,346,861
Patented Oct. 10, 1967

3,346,861

SUM-DIFFERENCE FEED NETWORK

George G. Chadwick, Annandale, Va., and John Paul Shelton, Bethesda, Md., assignors to Radiation Systems Incorporated, Alexandria, Va., a corporation of Nevada Filed July 12, 1966, Ser. No. 564,621
10 Claims. (Cl. 343—16)

ABSTRACT OF THE DISCLOSURE

A feed network for a monopulse system having a radiator element array with a twice odd number of arms, arranged with arms of the two sets of the array disposed 180° apart, the feed network including two hybrid phasing matrices each coupled to a different set of arms of the radiator array, and each having sum and difference mode branches, in which the corresponding difference mode branches are symmetrically connected so as to feed opposite arms in phase.

The present invention relates generally to feed networks applicable to monopulse tracking antennas, and more particularly, to sum-difference (Σ and Δ) feed networks with zero-boresight-error characteristics.

During the past twenty or so years several basic continuous tracking-radar systems have evolved, all characterized in that angular positioning of the antenna beam is accomplished by an error signal-actuated servomechanism although the mechanism by which the error signal is generated differs in each case and substantially determines the classification of each tracking-radar system. In essence a pencil-beam antenna is utilized in conjunction with some arrangement by which the angular position of the target relative to the antenna axis (i.e., the reference direction) may be determined so that the difference between target position and reference direction (termed "angular error") may be minimized. When the position of the antenna is, through tracking, such that the angular error is zero, the target is located along the reference direction. It is the method of determining magnitude and direction of angular error that classifies and characterizes the specific radar systems under the general classification "tracking radar."

Those skilled in the art are familiar, for example, with the early tracking radar technique of lobe switching (sequential lobing) wherein the antenna beam is sequentially switched through four positions in sectors of two orthogonal coordinates (azimuth and elevation), the difference in magnitude of the voltages obtained in the two switched positions in each coordinate determining the magnitude of the angular error (relative to the switching axis) for that coordinate, and the sign of the difference determining the direction of the angular error. Tracking proceeds in accordance with servomechanism actuation by the error signals, the object of course being to reduce the angular error to zero so that the target is "fixed" on the antenna (switching) axis whereupon position of the target may readily be determined. It is apparent that the accuracy with which target position is determined depends largely upon the maintenance of zero switching axis error; that is, that the switching axis be identical for each switched position.

More recently, two additional basic tracking systems have been developed, utilizing conical scan and monopulse tracking techniques, respectively. The conical scan technique differs primarily from the sequential lobing technique in that the antenna beam is rotated continuously about an axis (axis of rotation) from which the beam axis is offset. The rotation frequency modulates the echo signal returned from the target in all cases except when the target lies along the rotation axis; hence, the conical-scan modulation corresponds to the angular error signal and is extracted by a detector for comparison with azimuth and elevation reference signals from which appropriate servo-driving voltages are derived.

In the monopulse system, unlike the previously mentioned tracking systems, more than one antenna beam is utilized. The beams are offset and the signals received therefrom combined to simultaneously provide sum and difference signals which themselves are combined in order to obtain information necessary to determine angular error. Also unlike the other two basic tracking radar techniques, the monopulse system, as the name suggests, requires but a single pulse from which to derive the angular error information. The conventional two-coordinate (azimuth and elevation) monopulse system employs three R-F channels to obtain tracking error signals from the R-F characteristics of the system. When compared with the conical-scan tracking system, therefore, it will be noted that the latter enjoys certain advantages over the monopulse technique, primarily simplicity and reliability in that a single R-F channel is used, requiring only one receiver and a simple rotary joint. Conical scan, however, has the disadvantage of slow information rate; the information is contained in the modulation supplied by the nutating motion of the feed. Therefore, the tracking error outputs are based upon an audio information rate and are susceptible to variation of target return, noise in the closed loop servo system, and electronic countermeasures. The monopulse system on the other hand, has an inherently high information rate and does not suffer the last-mentioned disadvantages of conical scan. Moreover, monopulse tracking is a maximum gain system since in the boresight tracking condition the peak of the sum beam is located on the target. By eliminating one of the three receivers to obtain a two-channel monopulse system, thereby reducing problems of balancing and eliminating the necessity of providing three-channel rotary joints, the monopulse technique becomes more attractive in its comparison with the conical scan technique. It will further be noted that the two-channel monopulse system is easily applicable to methods of synthetic conical scan or sequential lobing, if desired. Perhaps more importantly, it allows maximum pattern and structural symmetry with attendant optimum design approaches. Consequently monopulse techniques are enjoying increasing popularity in the development of tracking-radar systems.

However, both three-channel and two-channel monopulse systems have had a similar operational problem in that the sum-difference feed networks employed therein have heretofore introduced imperfections and errors which cause the axis of the sum beam and/or the null associated with the difference beams to be displaced relative to the boresight axis of the antenna cluster, resulting in tracking errors and, as a consequence, in target position information errors.

Accordingly, it is a primary object of the present invention to provide new and improved sum-difference feed networks applicable to monopulse tracking antennas.

It is another object of the present invention to provide sum-difference feed networks with zero-boresight-error characteristics.

Briefly, according to the present invention, asymmetry and imperfections in the formation of the difference pattern of the monopulse system are substantially eliminated by provision of a sum-difference feed network which is symmetric with respect to the difference mode input port so that electrical error is obviated and boresight error, if any, is solely a function of mechanical tolerances. The symmetrical feed network requires that a multi-arm radiator structure be employed in the tracking system, and that the structure have a twice-odd number of arms, that is, $2(2N+1)$ arms, where $N \geqq 1$. The number of useful modes in such case is equal to 2N.

It is, therefore, another object of the invention to provide a symmetrical feed network for a monopulse tracking system employing a radiator structure having a twice-odd number of arms.

A further object of the invention is to provide sum-difference feed networks which allow the generation of dual-mode tracking patterns with boresight nulls independent of system component electrical tolerances.

The above and still further objects, features and attendant advantages of the present invention will become apparent from a consideration of the following detailed description of certain exemplary embodiments thereof, especially when taken in conjunction with the accompanying drawings in which:

FIGURES 1(*a*) and (*b*) are block diagrams of three-channel and two-channel monopulse systems, respectively;

FIGURE 2 presents a comparison of the R-F pattern and phase characteristics of the three- and two-channel systems;

FIGURE 3 is illustrative of the effect of imperfect sum-difference isolation in conventional monopulse systems;

FIGURES 4(*a*) and (*b*) show the manner in which a feed network of the present invention is assembled;

Figure 1:
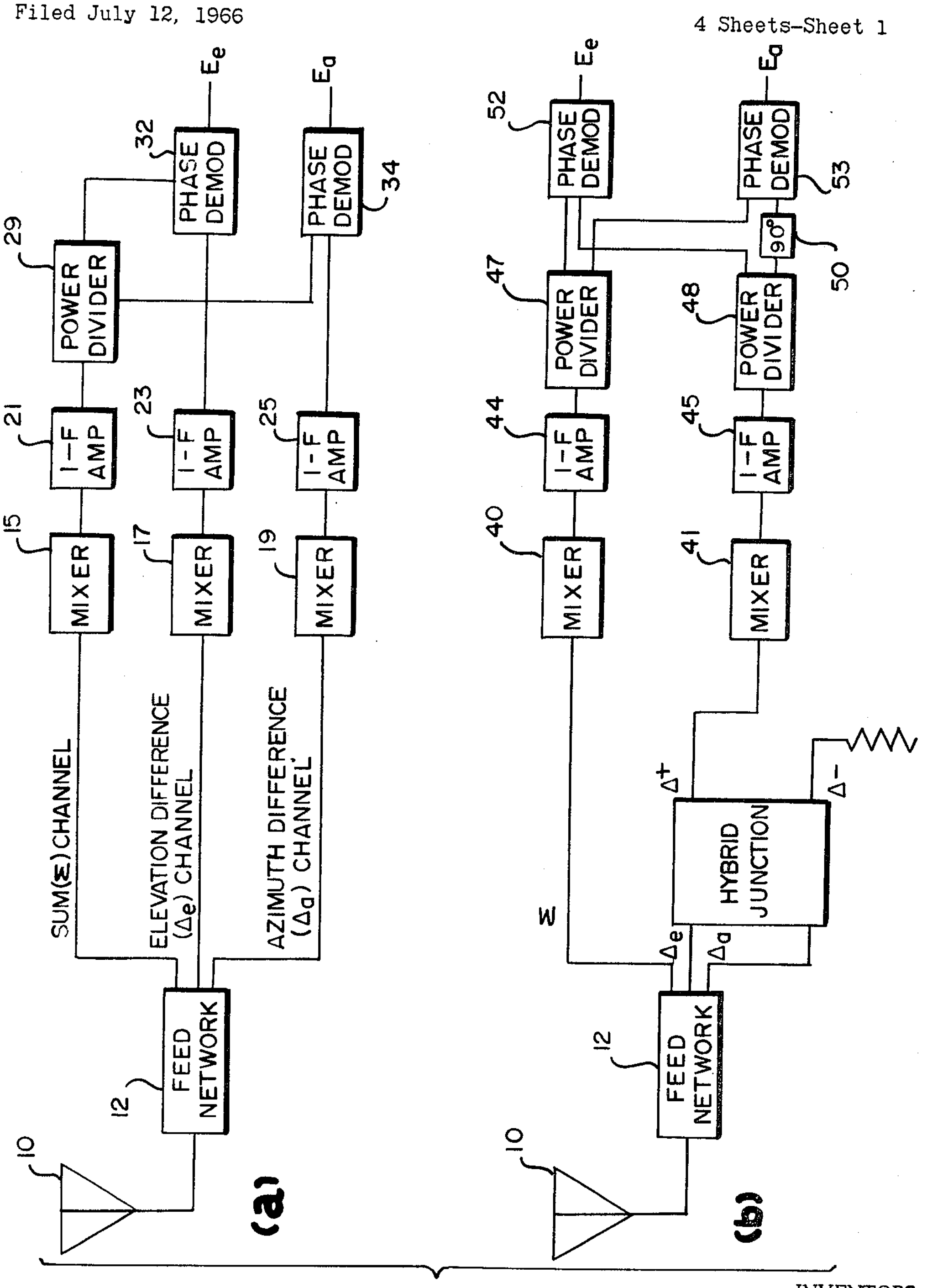

Referring now to FIGURE 1(*a*) of the drawings, wherein is shown a portion of a block diagram of a conventional three-channel monopulse system, radiator system 10 is coupled to the three receiving channels via a hybrid feed network 12 which provides three R-F outputs, namely, sum ($\Sigma$), difference elevation ($\Delta_e$), and difference azimuth ($\Delta_a$). Each of these three outputs is fed through a separate receiver including a mixer (15, 17, and 19, respectively) and an I-F amplifier (21, 23, and 25, respectively), and the sum, which is divided into two components by power divider 29, is compared with each of the differences in respective phase demodulators 32 and 34 to provide elevation error ($E_e$) and azimuth error ($E_a$) outputs, respectively. As previously stated, this type of monopulse system is wholly conventional.

In FIGURE 1(*b*), a block diagram of the relevant portion of a two-channel monopulse system, the same radiator 10 and hybrid feed network 12 are utilized, but the two difference outputs ($\Delta_e$ and $\Delta_a$) are combined in phase quadrature to provide a single complex difference channel. To this end, the $\Delta_e$ and $\Delta_a$ outputs may be supplied to a 90-degree phase shift hybrid junction to provide two complex difference channels, designated $\Delta+$ and $\Delta-$, one of which is the complex conjugate of the other, i.e., $\Delta+=.707(\Delta_a+j_e)$ and $j\Delta-=.707j(\Delta_n-j\Delta_e)$.

The resulting two channels are fed through separate receivers including mixers 40 and 41 and I-F amplifiers 44 and 45, respectively. After power division by dividers 47 and 48 and subjection of one of the component outputs of the complex difference channel to 90-degree phase shift through unit 50, the sum and difference outputs are compared through phase demodulators 52 and 53 to provide azimuth and elevation error outputs ($E_a$ and $E_e$, respectively). The basic distinction between the three-channel monopulse system and the two-channel monopulse system, then, is that in the former both the azimuth and the elevation difference channels are required to obtain tracking information, whereas in the latter the same information is provided in each of the error channels.

Figures 2, 3:
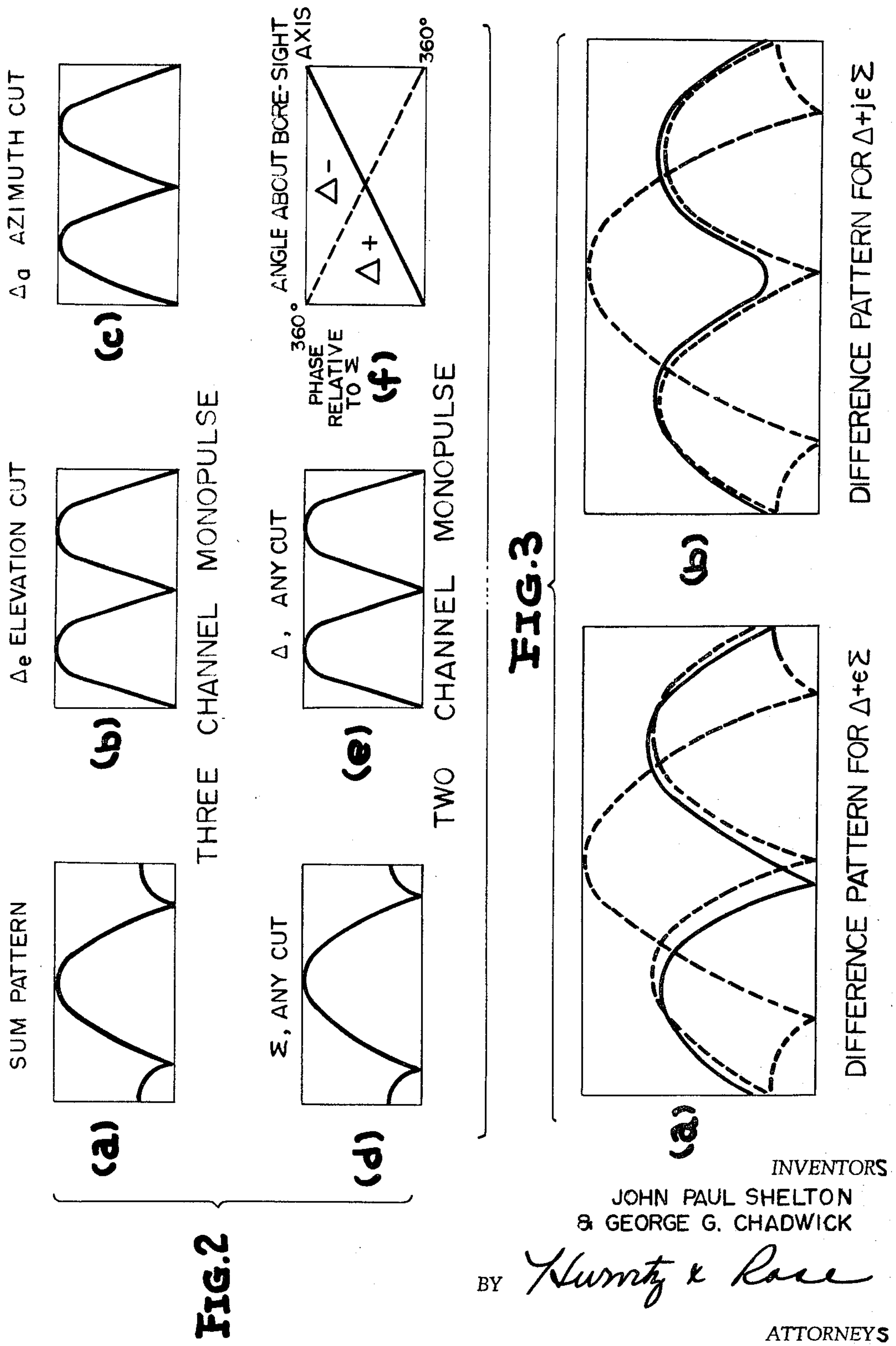

Referring now to FIGURE 2, a comparison of theR-F pattern and phase characteristics of the three- and two-channel systems is readily observed by consideration of parts (*a*), (*b*), (*c*), relating to the former, and parts (*d*), (*e*), (*f*), relating to the latter. Obviously, the sum patterns (FIGS. 2(*a*) and (*d*)) are identical, as is readily apparent from the systems shown in FIGURE 1. The difference patterns (FIGS. 2(*b*), (*c*) and (*e*)) are similar except that the two-channel difference pattern is the same for any cut (section) through the boresight axis of the antenna. Although not apparent from the figure, the opposite lobes of the difference patterns are out of phase with one another so that 180-degree phase shift is experienced upon passing through the null. Although the magnitude of the tracking error in a given plane is determined by comparing the amplitude of the difference pattern with that of the sum pattern, the information as to whether the error is right or left for elevation and up or down for azimuth is contained in the relative phase between the sum channel and the appropriate difference channel. Hence, the need for phase sensitive demodulation even in an amplitude-comparison monopulse system. In the two-channel monopulse system the phase is especially important because relative phase between sum and difference channels determines the direction off axis (i.e., around the axis) from which the received signal is obtained.

From FIGURE 2(*f*) it will be noted that the phases o1 both $\Delta+$ and $\Delta-$ relative to the sum channel are directly proportional to the angle about the boresight axis.

Referring now to FIGURES 3(*a*) and (*b*), the possible effects of imperfect sum-difference isolation are illustrated by certain imperfections in the antenna patterns for the three channel system. An imperfect formation of the difference channel may occur through an addition of a small amount of signal in the sum channel to the difference channel. The effect of such addition depends upon whether the small amount of sum channel is added in phase or in phase quadrature to the difference channel pattern in a given plane through the axis. In phase addition results in an asymmetric difference pattern as shown in FIGURE 3(*a*). It will be noted that the null remains perfect but is displaced from the boresight axis. If the unwanted sum channel is added in phase quadrature, the difference pattern remains symmetrical but the null is filled in and is no longer a perfect minimum point, as shown in FIGURE 3(*b*). FIGURES 3(*a*) and (*b*) are applicable to both types of monopulse systems. However, since the relative phase difference between the sum and difference channels varies through 360° about the target axis, there is always an angle where the residual sum signal equals the difference channel level and is out of phase with it. Hence a two channel system will always have a null which is perfectly deep but located at some point in space determined by the relative phase and amplitude of the residual sum signal content (i.e., there is *always* one plane through the boresight axis which has the geometry of FIGURE 3(*a*); a condition not true for imperfect three channel systems).

A similar situation exists in the case of the addition of a portion of the difference channel into the sum channel, except that there results a displacement of the peak of the sum beam off the boresight axis rather than displacement of the null of the difference channel.

It is a primary feature of the present invention that feed networks are provided which are applicable to monopulse tracking antennas generally, and in particular to two-and-three-channel monopulse systems, to allow the generation of dual-mode tracking patterns with boresight nulls independent of systematic electrical tolerances of the system. In essence, the feed network is symmetric with respect to the difference mode input port, so that any boresight error is purely a function of mechanical tolerances of system components. While two specific examples by which suitable feed networks are implemented will be described in the subsequent paragraphs, it is to be emphasized that the technique is general and may be utilized in conjunction with any radiator structure having a twice-odd number of arms (i.e., $2(2N+1)$, where $N \geqq 1$), and for all types of wideband passive tracking systems.

Figure 4B:
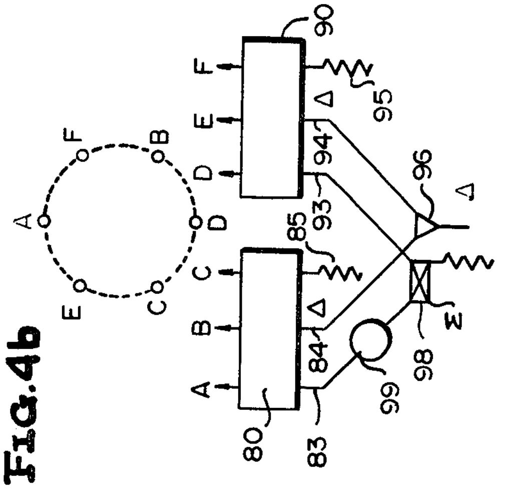
Figure 4A:
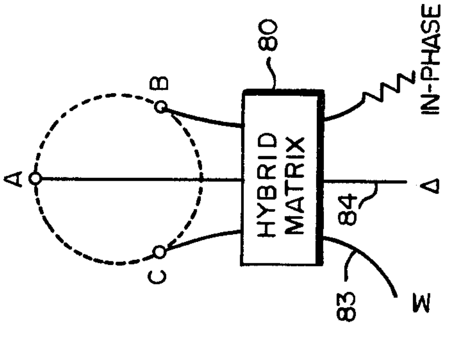

Referring now to FIGURE 4(*a*), an odd number of radiator arms, designated generally as A, B, and C, are coupled to a hybrid feed network or matrix 80 for the various possible axially symmetric modes. One suitable hybrid phasing matrix for such an array is described, for example, in Shelton and Kelleher, "Multiple Beams from Linear Arrays," IRE Transactions on Antennas and Propagation, vol. AP–9, No. 2 (March 1961). See, also, Butler "Beam-Forming Matrix Simplifies Design of Electronically Scanned Antennas," Electronic Design, vol. 9, No. 8, (Apr. 12, 1961) pp. 170–173.

It will be noted that sum and difference modes have separate outputs (83 and 84) among the odd number of outputs of hybrid network 80. A second identical set of radiator elements or arms (D, E, and F) is added to the array of three existing elements A, B, and C, so that each of the added elements is placed midway between each pair of existing elements, and a second hybrid network 90, identical to the first, used for the added arms. Such an arrangement is shown in FIGURE 4(*b*). Of course, it will be appreciated that a six-element symmetric array (A, B, C, D, E, F) may be provided initially and the hybrid phasing networks 80 and 90, along with coupling lines, connected subsequently to the array. One suitable antenna configuration, for example, is a six-element log-periodic array. It is essential, in any event, that the elements of the two sets be disposed 180 degrees apart, a configuration which is readily provided for two sets each having an odd number of arms. If an even number of elements were used initially, however, it is apparent that the elements of one array would be opposed before the second array was added; hence, an array consisting of a twice-even number of arms is unsuitable.

For the difference mode, opposite arms are fed in phase. To this end, the difference ports 84 and 94 of each of the hybrid phasing matrices 80 and 90, respectively, are connected to a two-way power divider 96 for a completely symmetric structure. The sum ports 83 and 93 are connected to a conveniental 3-db hybrid coupler 98 via a 90-degree phase shifter 99, the tolerances of these components being relatively less critical to system operation.

Figure 5:
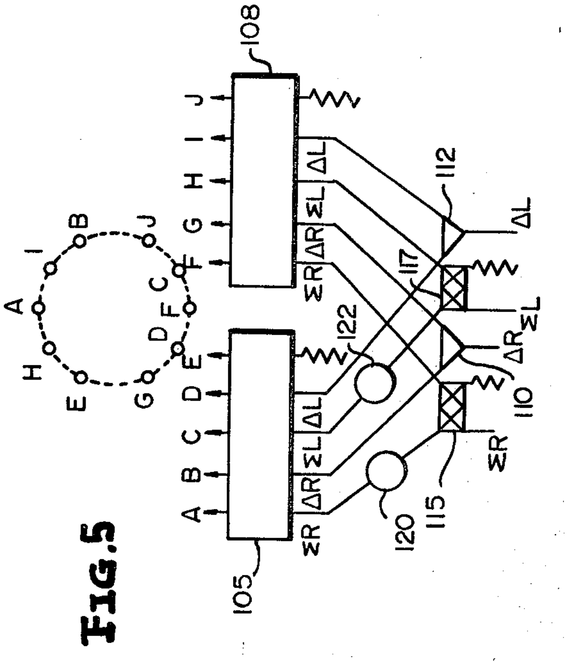
FIGURE 5 is a diagram of a feed network for a polarization diversity system.

In general, a six-arm structure can be used for four modes, sum and difference for two polarizations. However, the use of the power divider makes the oppositely sensed modes either unavailable or imperfect. Consequently, polarization diversity may be obtained using a ten-arm antenna array as shown in FIGURE 5. The coupling connectors for the several arms are designated A–J and each is coupled in alternation to a respective one of the two five-element hybrid phasing matrices 105, 108. Each matrix has output ports for sum and difference, right and left hand circular polarization. Again, each of the two corresponding difference ports ($\Delta R-\Delta R$ and $\Delta L-\Delta L$, respectively) is coupled through a separate two-way power divider (110, 112) to provide $\Delta R$ and $\Delta L$ channels; while the corresponding $\Sigma R$ and $\Sigma L$ ports are coupled to 3-db hybrid couplers 115, 117 via 90 degree phase shifters 120, 122, respectively for the right- and left-hand sum channels.

Figure 6:
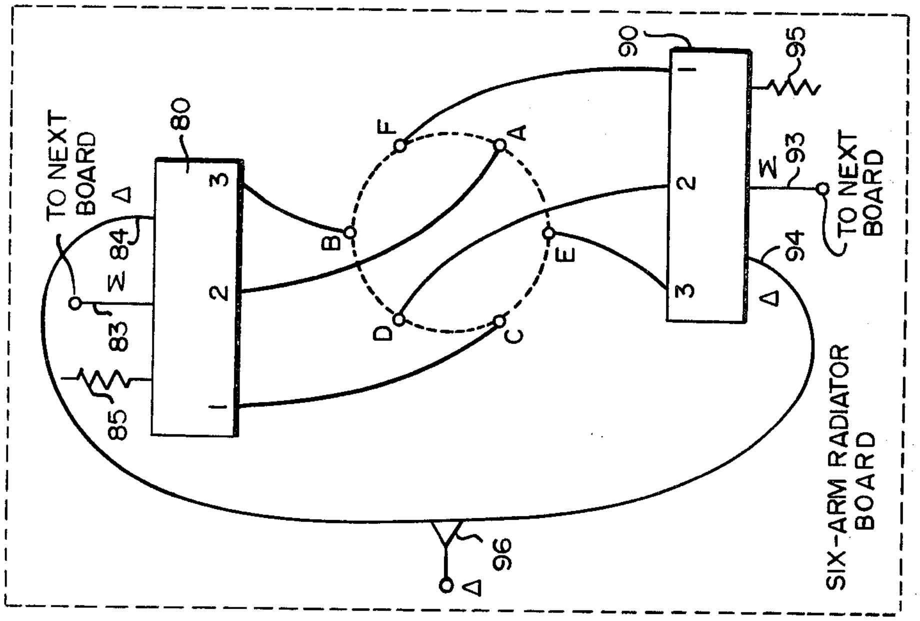
FIGURE 6 is a diagram indicating the layout of a strip transmission line feed network for mechanical symmetry in the development of the difference mode.

Feed network design may utilize the strip-line techniques for fabrication of components and coupling leads as set forth in the co-pending application of Shelton, entitled "Wideband TEM Components," Ser. No. 485,723, filed Sept. 8, 1965, and commonly assigned herewith. The difference mode for the multi-arm feed system is preferably developed in a single layer of strip-line with a mechanically symmetrical network, in order to preserve mechanical as well as electrical symmetry of the feed network with respect to the difference mode input port which is critical to the invention. A suitable feed layout in strip-line configuration on an insulative board, for a six-arm radiator, is shown in FIGURE 6. The sum channel, for which symmetry and component tolerances are less critical, may be combined on another layer. The reference characters shown in FIGURE 6 correspond identically to those used to designate like components in FIGURE 4(*b*).

Figure 7:
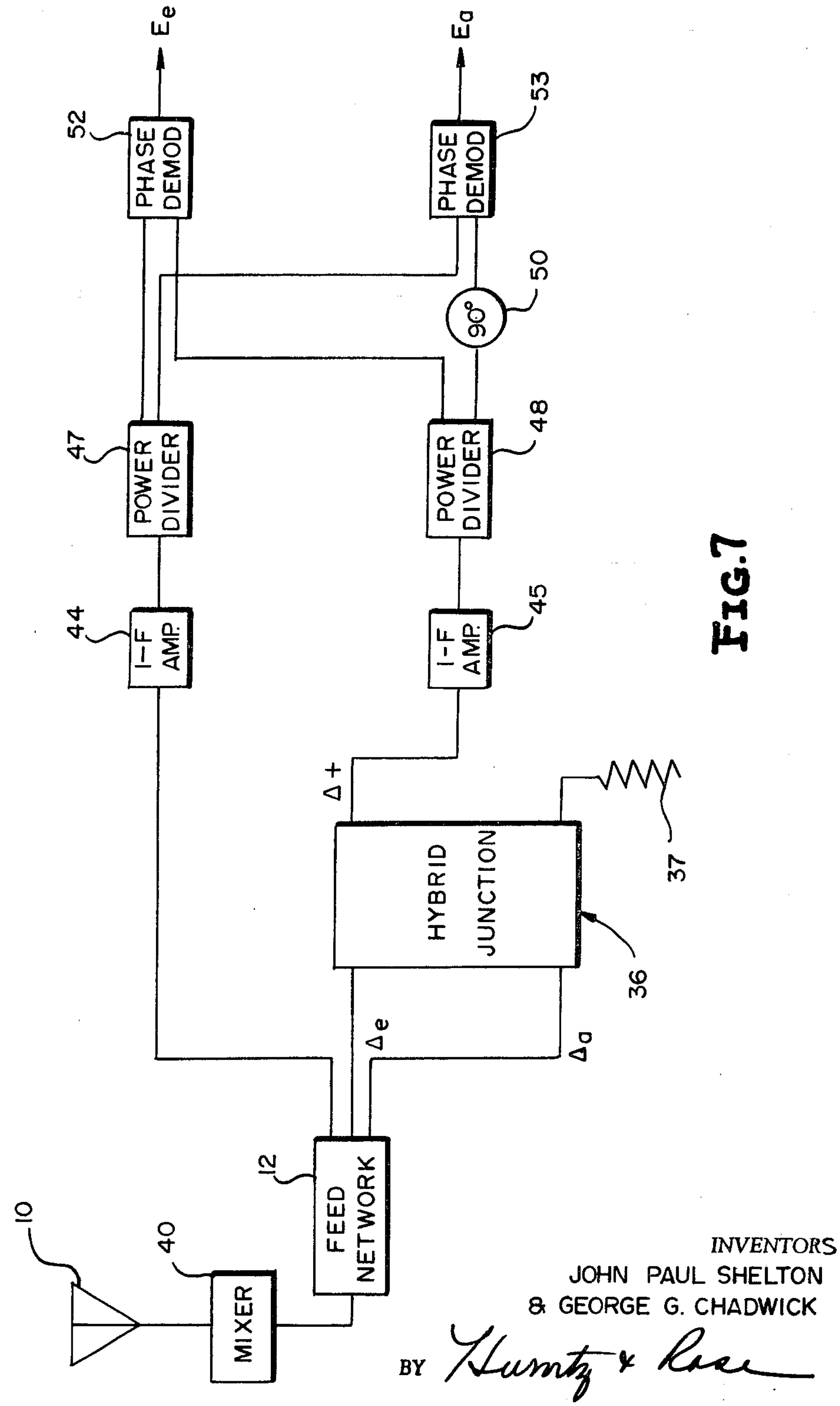
FIGURE 7 is a diagram of an alternative two channel monopulse embodiment by which the same symmetric technique is utilized for IF (intermediate frequency) signals.

FIGURE 7 illustrates an application of the technique at I-F frequencies. The mixer 90 is now located between the antennas and the feed network, otherwise the operation is identical to that of FIGURE 1. The advantage of this approach is that the feed network may be designated for a single I-F frequency, independent of the bandwidth of the antenna. As will be apparent to those skilled in the art it is simpler to design a network at I-F frequencies. The problem is further simplified by the fixed (I-F) frequency of operation. Band tuning is achieved by varying the local oscillator frequency within the mixer network.

From the above description of preferred embodiments, it will be apparent that the present invention provides feed network configurations effective to separate sum and difference modes of the monopulse system while maintaining feed network symmetry with respect to the difference mode input port, so that boresight error is produced only by mechanical tolerances of the components.

While we have disclosed certain preferred embodiments of our invention, it will be clear to those skilled in the art that variations in the specific details of construction which have been illustrated and described may be resorted to without departing from the spirit and scope of the invention, as defined in the appended claims.

We claim:

1. A sum-difference feed network for a monopulse system having a radiator structure with $2(2N+1)$ arms, where N is an integer greater than or equal to one, said feed network comprising a pair of hybrid phasing matrices each coupled to a different set of $(2N+1)$ arms of said radiator structure, each set characterized by arms disposed 180 degrees apart from the arms of the other set, each of said hybrid phasing matrices having sum and difference mode terminals, and power dividing means symmetrically coupled to the corresponding difference mode terminals of each of said matrices for each sense of polarization.

2. The combination according to claim 1 including 3-db hybrid coupling means, and means connecting the corresponding sum mode terminals of each of said matrices to said 3-db hybrid coupling means for each sense of polarization, said connecting means including a 90-degree phase shifter between the sum mode terminals of one of said matrices and the 3-db hybrid coupling means for each sense of polarization.

3. A feed network for a monopulse antenna system having two identical arrays of antenna elements so arranged that the elements of each array are disposed 180 degrees apart from the corresponding elements of the other array, said network comprising a first and a second hybrid phasing matrix, means coupling corresponding elements of each array in identical fashion to separate ones of said matrices, each matrix having sum and difference ports for each sense of polarization with which said system is to operate, power dividing means for each sense of polarization, and means connecting each power dividing means to respective difference ports of said matrices associated with each sense of polarization.

4. The combination according to claim 3 wherein is further included power dividing means for each sense of polarization for the respective sum ports, and phase shifting means coupling the sum ports of one of said first and said second hybrid phasing matrix to the last-named power dividing means.

5. The combination according to claim 3 wherein said two identical arrays form a single log-periodic array.

6. The combination according to claim 3 wherein said difference mode for said feed network is developed in symmetrical conductive stripline configuration on a single insulative board.

7. In a monopulse tracking system, the combination comprising two arrays of antenna elements of an identical odd number of elements, respective elements of the two arrays disposed 180° apart, two hybrid networks each coupled to a separate respective array of said antenna elements and each having separate ports for sum and difference modes, and means symmetrically coupling respective difference ports of said hybrid networks to feed opposite arms in phase in the difference mode, whereby to provide substantially zero boresight error characteristics in said system.

8. The combination according to claim 7 wherein said means includes a separate power divider connected to each pair of respective difference ports.

9. The combination according to claim 8 wherein is further provided means for connecting each pair of respective sum ports of said hybrid networks, the last-named connecting means including a phase shifter for at least one of the sum ports of each pair.

10. The combination according to claim 9 wherein said radiator element array is a log-periodic array.

References Cited

UNITED STATES PATENTS

| | | | |
|---|---|---|---|
| 3,059,234 | 10/1962 | Duhamel et al. ---- | 343—836 X |
| 3,147,479 | 9/1964 | Williams --------- | 343—836 X |
| 3,176,297 | 3/1965 | Forsberg ---------- | 343—100 |
| 3,209,355 | 9/1965 | Livingston --------- | 343—100 |

RICHARD A. FARLEY, *Primary Examiner.*

RODNEY D. BENNETT, *Examiner.*

J. P. MORRIS, *Assistant Examiner.*